United States Patent

Osawa

[11] Patent Number: 5,088,318
[45] Date of Patent: Feb. 18, 1992

[54] DETERMINING DEVICE FOR DETERMINING A FAILURE IN AN ENGINE CYLINDER

[75] Inventor: Kouichi Osawa, Susono, Japan

[73] Assignee: Toyota Jidosha Kabushiki Kaisha, Toyota, Japan

[21] Appl. No.: 677,113

[22] Filed: Mar. 29, 1991

[30] Foreign Application Priority Data

Apr. 2, 1990 [JP] Japan .................................. 2-88093

[51] Int. Cl.⁵ .......................................... G01M 15/00
[52] U.S. Cl. .................................................. 73/117.3
[58] Field of Search ............... 73/117.3, 116; 123/419, 123/436; 364/431.03, 431.07, 431.08

[56] References Cited

U.S. PATENT DOCUMENTS

| | | | |
|---|---|---|---|
| 4,586,369 | 5/1989 | Vogler | 73/117.3 |
| 4,930,479 | 6/1990 | Osawa et al. | 123/436 |
| 5,041,980 | 8/1991 | Maddock et al. | 73/116 X |

FOREIGN PATENT DOCUMENTS

| | | |
|---|---|---|
| 61-81532 | 4/1986 | Japan . |
| 61-258955 | 11/1986 | Japan . |
| 2-49955 | 2/1990 | Japan . |
| 2-286853 | 11/1990 | Japan . |

Primary Examiner—Jerry W. Myracle
Attorney, Agent, or Firm—Kenyon & Kenyon

[57] ABSTRACT

A determining device for determining a failure in an engine cylinder of an internal combustion engine, comprising a variation detecting unit for sequentially detecting a variation in an engine speed between a first engine speed detected by an engine speed detecting unit during a combustion process at a first engine cylinder and a second engine speed detected by the engine speed detecting unit during a combustion process at a second engine cylinder immediately preceding the first engine cylinder with respect to an ignition sequence of all of the engine cylinders, a first determining unit for determining that a misfire has occurred when the variation in the engine speed detected by the variation detecting unit is larger than a predetermined first variation in the engine speed, a second determining unit for determining that a failure has occurred in an engine cylinder when a frequency at which the first determining unit determines that a misfire has occurred is larger than a predetermined frequency, and a value control unit for increasing at least one of the predetermined first variation in the engine speed and the predetermined frequency in accordance with an increase in the engine load detected by the engine load detecting unit.

17 Claims, 10 Drawing Sheets

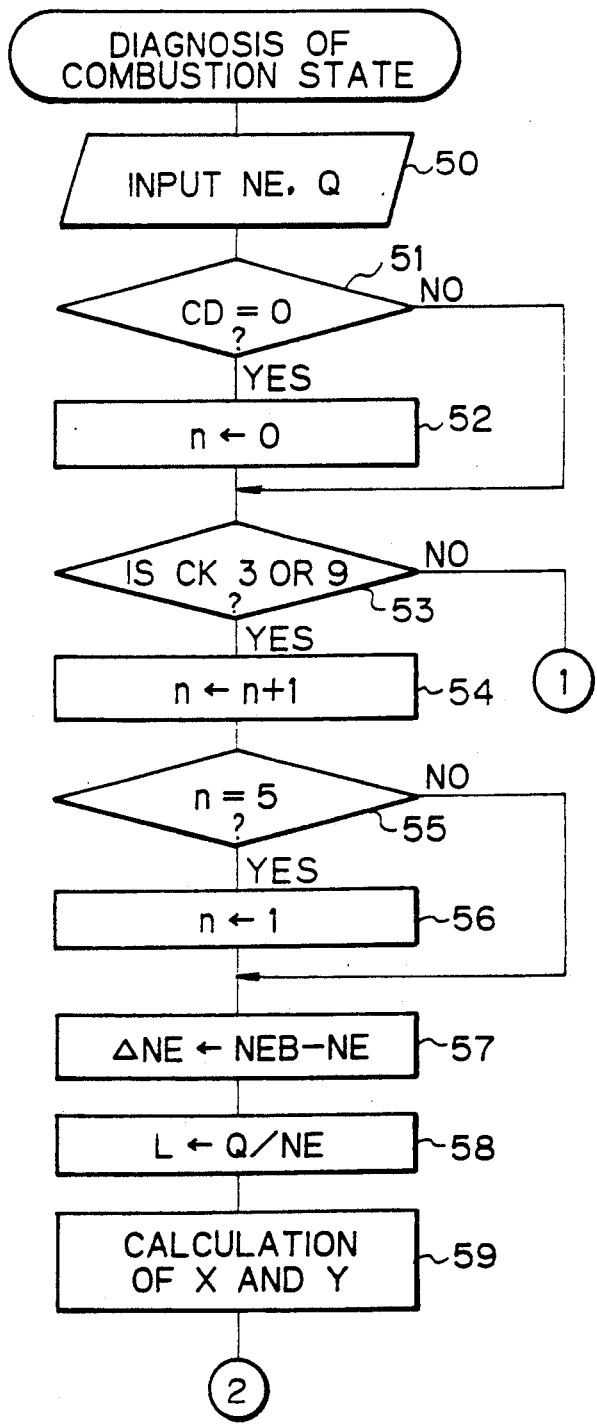

DETERMINING DEVICE FOR DETERMINING A FAILURE IN AN ENGINE CYLINDER

BACKGROUND OF THE INVENTION

1. Field of the Invention

The present invention relates to a determining device for determining a failure in an engine cylinder of an internal combustion engine.

2. Description of the Related Art

Japanese Unexamined Patent Publication No. 61-258955, discloses a determining device for determining a failure in an engine cylinder of an internal combustion engine having a plurality of cylinders. In this device, an engine speed during a combustion process in each cylinder is sequentially detected, and variations in the engine speed at the successive stages of the combustion process in each cylinder are calculated. Note the variation in engine speed is defined as the difference between two successive engine speeds at two successive stages of the combustion process. The variation $\Delta NE$ in the engine speed is calculated from the following equation.

$$\Delta NE = NEB - NE$$

Where NE: an engine speed in a present stage of the combustion process

NEB: an engine speed in a stage of the combustion process immediately preceding the present stage of the combustion process.

When the variation in the engine speed is larger than a predetermined constant reference value X, a misfire count value is increased by 1, and when the misfire count value becomes larger than a predetermined failure count value, a failure has occurred.

In this device, however, a problem arises in that it cannot be exactly determined whether or not a failure has occurred in an engine cylinder, as described below.

FIGS. 9 illustrate the occurrence frequency of the variation $\Delta NE$ in the engine speed under a low engine load, and FIG. 10 illustrates the occurrence frequency of the variation $\Delta NE$ in the engine speed under a high engine load. Note, No. 1, No. 2, No. 3, and No. 4 cylinders are normal functioning cylinders. Referring to FIGS. 9 and 10, the variation $\Delta NE$ in the engine speed in the failed cylinder is increased in accordance with an increase of an engine load, and a distribution area of the variation $\Delta NE$ in the engine speed in each normal functioning cylinder is extended in accordance with the increase in the engine load.

Accordingly, when the predetermined reference value X is fixed at $X_1$, as shown in FIG. 9, it is possible that it is determined that the normal functioning cylinder (for example, No. 3 cylinder) is a failed cylinder, under a high engine load, as shown in FIG. 10.

Conversely, when the predetermined reference value X is fixed at $X_2$ as shown FIG. 10, a failed cylinder cannot be detected under a low engine load, as shown in FIG. 9.

SUMMARY OF THE INVENTION

An object of the present invention is to provide a determining device capable of accurately determining a failure in an engine cylinder.

Therefore, according to the present invention, there is provided a determining device for determining a failure in an engine cylinder of an internal combustion engine, comprising: an engine load detecting means for detecting an engine load; an engine speed detecting means for detecting an engine speed at a predetermined crank angle; a variation detecting means for sequentially detecting a variation in an engine speed between a first engine speed detected by the engine speed detecting means during a combustion process at a first engine cylinder and a second engine speed detected by the engine speed detecting means during a combustion process at a second engine cylinder immediately preceding the first engine cylinder with respect to an ignition sequence of all of the engine cylinders; a first determining means for determining that a misfire has occurred when the variation in the engine speed detected by the variation detecting means is larger than a predetermined first variation in the engine speed; a second determining means for determining that a failure has occurred in an engine cylinder when a frequency thereof at which first determining means determines that a misfire has occurred is larger than a predetermined frequency; and a value control means for increasing at least one of the predetermined first variation in the engine speed and the predetermined frequency in accordance with an increase of the engine load detected by the engine load detecting means.

The present invention may be more fully understood from the description of preferred embodiment of the invention set forth below, together with the accompanying drawings.

DESCRIPTION OF THE PREFERRED EMBODIMENTS

Figure 1:
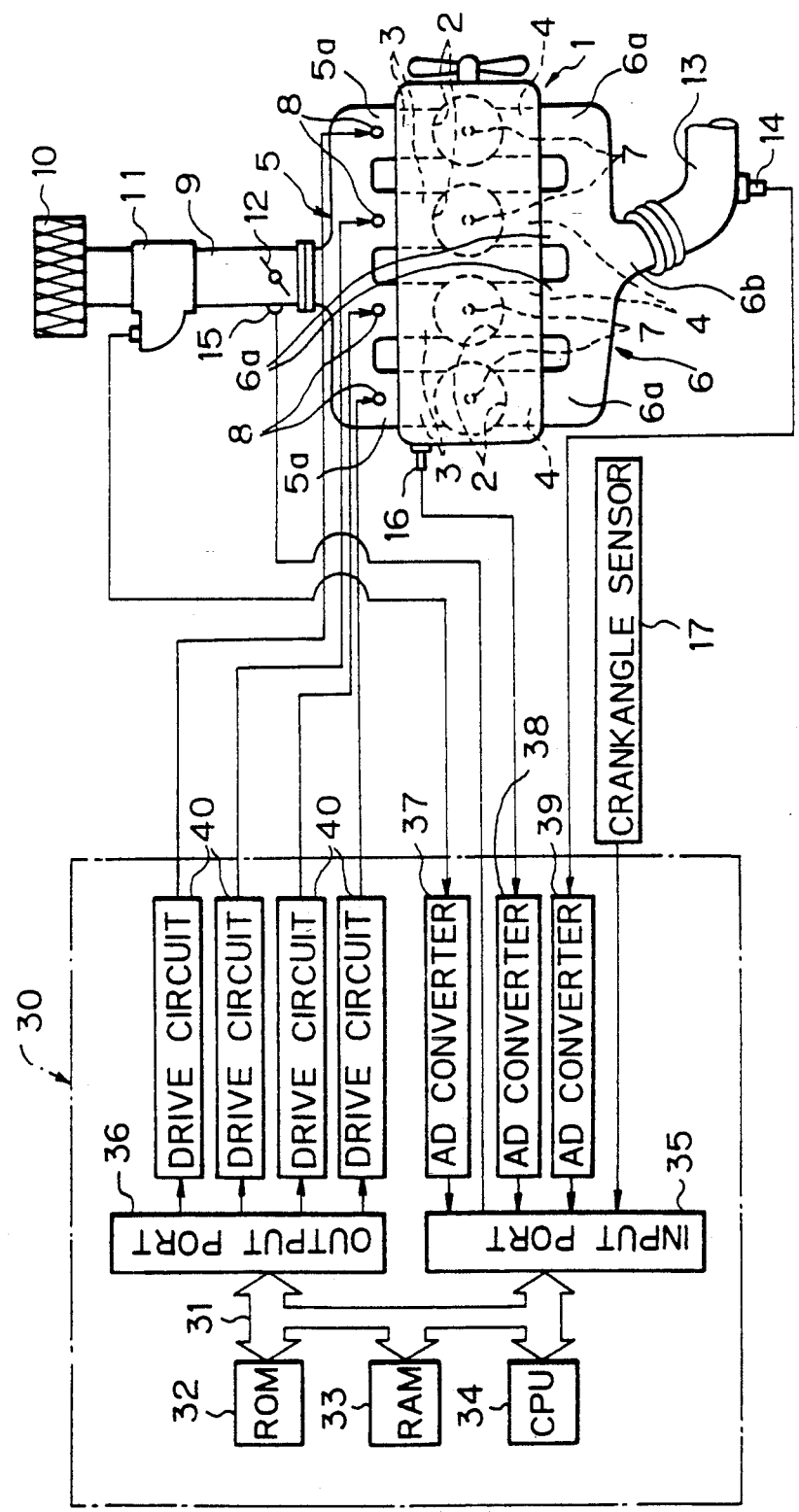
FIG. 1 is a schematic view of a four-cylinder engine.

Referring to FIG. 1, which shows a four-cylinder engine, 1 designates an engine body, 2 a cylinder, 3 an intake port, 4 an exhaust port, 5 an intake manifold, 6 an exhaust manifold, and 7 a spark plug arranged in each cylinder 2. Each intake branch pipe 5a of the intake manifold 5 is connected to each corresponding intake port 3, and fuel injectors 8 for injecting fuel to each intake port 3 are arranged in each intake branch pipe 5a. The intake manifold 5 is connected to an air cleaner 10 via a intake pipe 9 having an air flow meter 11 arranged therein and a throttle valve 12 is arranged in the intake pipe 9 downstream of the air flow meter 11. Each exhaust branch pipe 6a of the exhaust manifold 6 is connected to each corresponding exhaust port 4, and the exhaust manifold 6 is connected to the exhaust pipe 13 at a junction 6b.

The electronic control unit 30 is constructed as a digital computer and comprises a ROM (read only memory) 32, a RAM (random access memory) 33, a CPU (microprocessor, etc.) 34, an input port 35, and an output port 36. The ROM 32, the RAM 33, the CPU 34, the input port 35, and the output port 36 are interconnected via a bidirectional bus 31.

The air flow meter 11 is connected to the input port 35 via an AD converter 37, and a throttle switch 15 for detecting an idling degree of opening of the throttle valve 12 is attached to the throttle valve 12, and signals output by the throttle switch 15 are input to the input port 35. A cooling water temperature sensor 16 for detecting a temperature of a cooling water for the engine is arranged in the engine body 1, and is connected to the input port 35 via an AD converter 38, and an $O_2$ sensor 14 is arranged in the exhaust pipe 13, and is connected to the input port 35 via an AD converter 39. A crank angle sensor 17 generates a pulse at predetermined crank angles, and the pulses output by the crank angle sensor 17 are input to the input port 35, and accordingly, an engine speed is calculated on the basis of the pulses output by the crank angle sensor 17.

The output port 36 is connected to each fuel injector 8 via corresponding drive circuits 40.

Figure 2B:
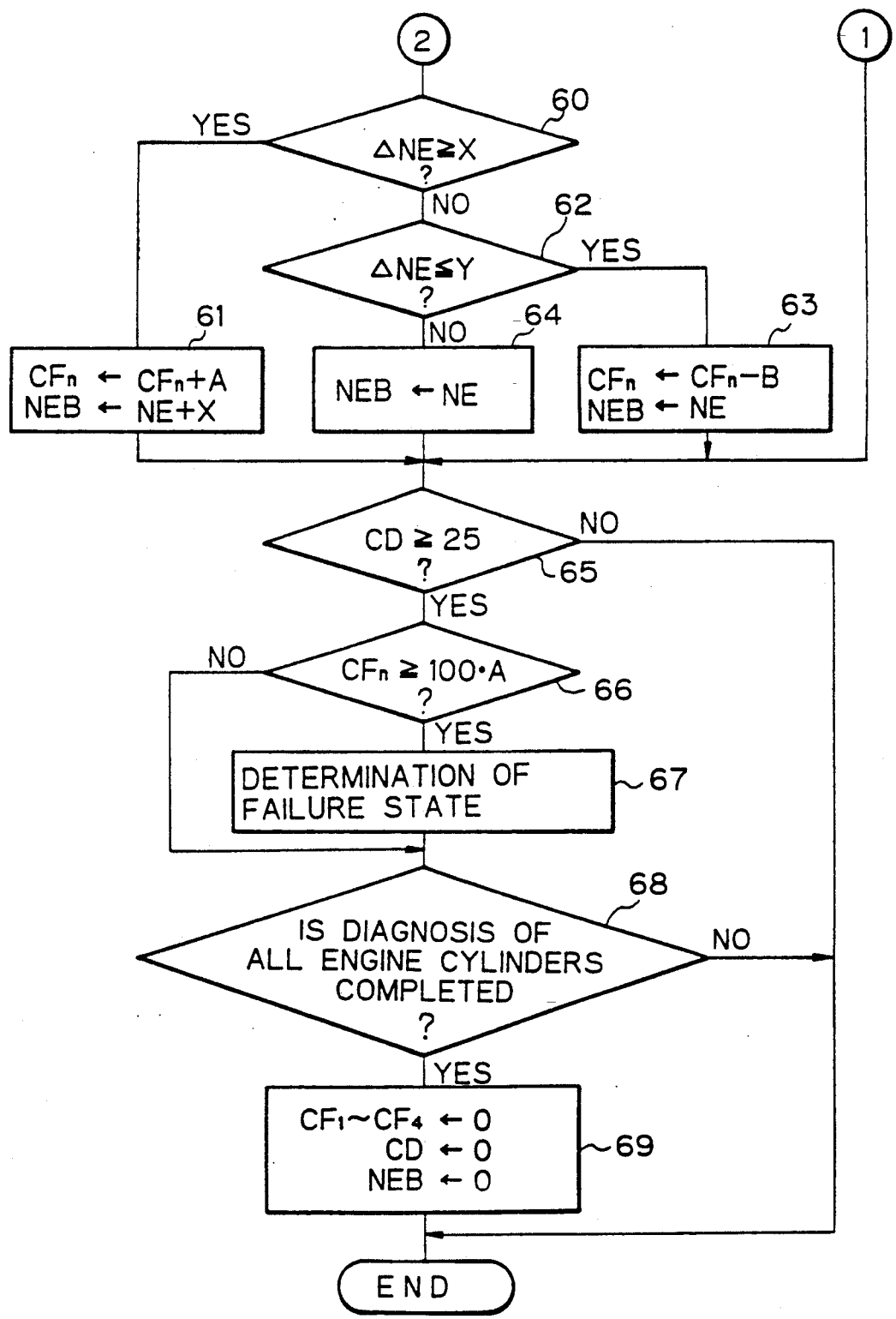
FIG. 2 (including parts A and B) is a flow chart of a first embodiment for executing a diagnosis of a combustion state according to the present invention.

FIG. 2 illustrates a routine for executing a diagnosis of a combustion state in accordance with a first embodiment of the present invention. The routine illustrated in FIG. 2 is processed by sequential interruptions executed at every crank angle (CA) of 30°.

Referring to FIG. 2, at step 50, an engine speed NE detected by the crank angle sensor 17, and an amount of air Q fed into the engine cylinder and detected by the air flow meter 11, are input to the CPU 34. Then, at step 51, it is determined whether or not a time count value CD is equal to 0. The time count value CD represents a time elapsed from the start of the diagnosis. If the time count value CD is equal to 0, the routine goes to step 52, and the cylinder number n is made 0. Note, the cylinder number n represents the cylinder firing order. Conversely, if the time count value CD is not equal to 0, step 52 is skipped. Then, at step 53, it is determined whether or not a crank angle count value CK is equal to 3 or 9.

Figure 3:
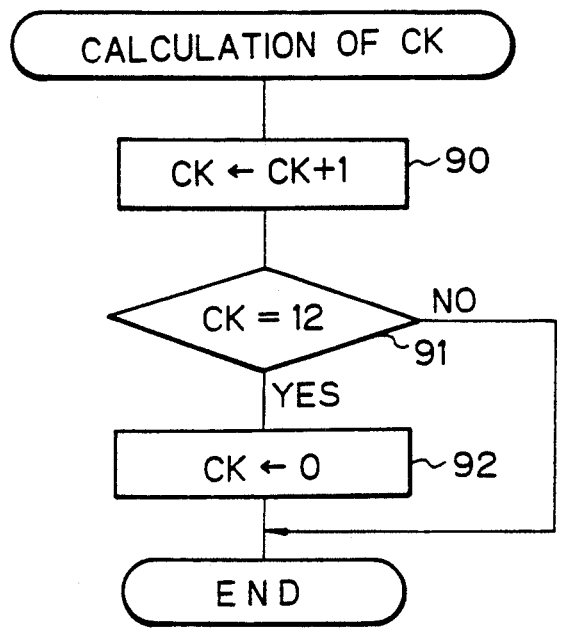
FIG. 3 is a flow chart for executing the calculation of the crank angle count value CK.

FIG. 3 illustrates a routine for the calculation of the crank angle count value CK. This routine is processed by sequential interruptions executed at every crank angle of 30°.

Referring to FIG. 3, at step 90, the crank angle count value CK is incremented by 1, and at step 91 it is determined whether or not the crank angle count value CK is equal to 12. If the crank angle count value CK is equal to 12, the routine goes to step 92, and the crank angle count value CK is cleared. If the crank angle count value CK is not equal to 12, the crank angle count value CK is maintained as it is, and the processing cycle is completed.

Returning to FIG. 2, at step 53, if the crank angle count value CK is not equal to 3 and 9, the routine goes to step 65 and a determination of whether or not a misfire has occurred is not executed. At step 53, if the crank angle count value CK is equal to 3 or 9, the routine goes to step 54 and the cylinder number n is incremented by 1. At step 55, it is determined whether or not the cylinder number n is equal to 5, and if n=5, the routine goes to step 56 and the cylinder number n is made 1. At step 55, if the cylinder number n is not equal to 5, the routine goes to step 57 and a variation $\Delta NE$ in the engine speed is calculated from the following equation.

$$\Delta NE = NEB - NE$$

Where NE is an engine speed in a present combustion process, for example, in No. 1 cylinder (cylinder number n=1), and NEB is an engine speed in a previous combustion process executed immediately before the present combustion process. In this case NEB is an engine speed in a combustion process in No. 4 cylinder (cylinder number n=4), and the combustion process in No. 4 cylinder is executed at a crank angle of 180° before the execution of the combustion process in No. 1 cylinder.

At step 58, an engine load L is calculated from the following equation:

$$L = Q/NE$$

and at step 59, reference values X and Y are calculated from a map, on the basis of the engine load L.

Figure 4:
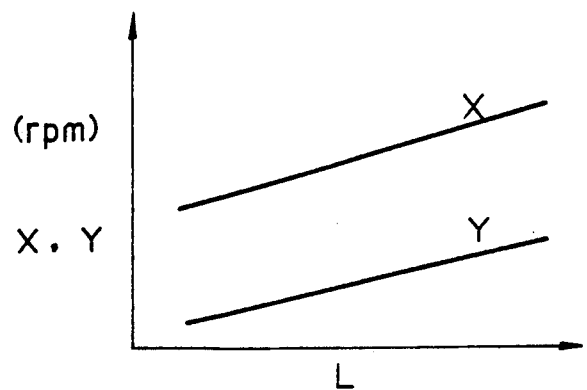
FIG. 4 illustrates the relationships between the reference value X and the engine load L, and between the reference value Y and the engine load L.

FIG. 4 illustrates the relationship between X and L, and the relationship between Y and L. The reference values X and Y are proportional to the engine load L, and are increased as the engine load L is increased. The reference value X is always larger than the reference value Y.

Figure 9:
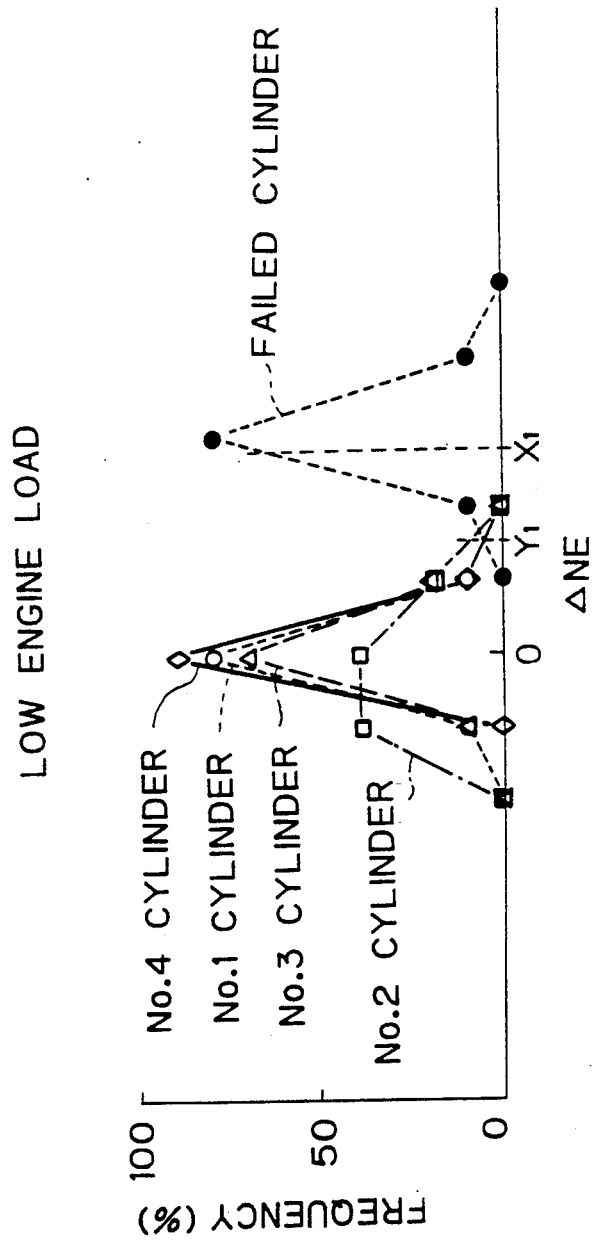
FIG. 9 illustrates the occurrence frequency of the variation $\Delta NE$ in the engine speed under a low engine load.
Figure 10:
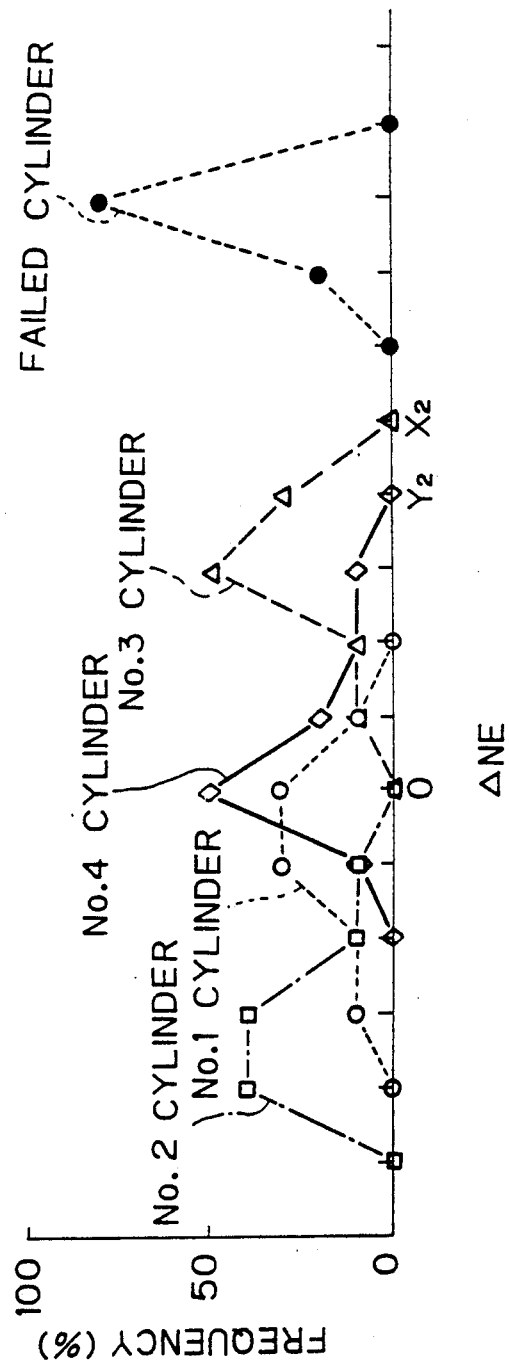
FIG. 10 illustrates the occurrence frequency of the variation $\Delta NE$ in the engine speed under a high engine load.

The reference values X and Y are $X_1$ and $Y_1$ under a low engine load as shown in FIG. 9, and are $X_2$ and $Y_2$ under a high engine load as shown in FIG. 10.

Returning to FIG. 2, at step 60, it is determined whether or not the variation $\Delta NE$ in engine speed is equal to or larger than the reference value X. If $\Delta NE \geq X$, i.e., it is determined that a misfire has occurred, the routine goes to step 61 where the misfire count value $CF_n$ of the No. n cylinder is increased by A and the reference value X is added to the engine speed NE. This NE+X is held as NEB and is used in step 57 in the next diagnosis process. At step 60, if $\Delta NE < X$, the routine goes to step 62 and it is determined whether or not the variation $\Delta NE$ in the engine speed is equal to or smaller than the reference value Y, which is smaller than the reference value X. If $\Delta NE \leq Y$, i.e., it is determined that a misfire has not occurred, the routine goes to step 63. At step 63, a predetermined value B is subtracted from the misfire count value $CF_n$ of the No. n cylinder and the engine speed NE is memorized as NEB. At step 62, if $\Delta NE > Y$, the routine goes to step 64 and the engine speed NE is memorized as NEB.

Figure 5:
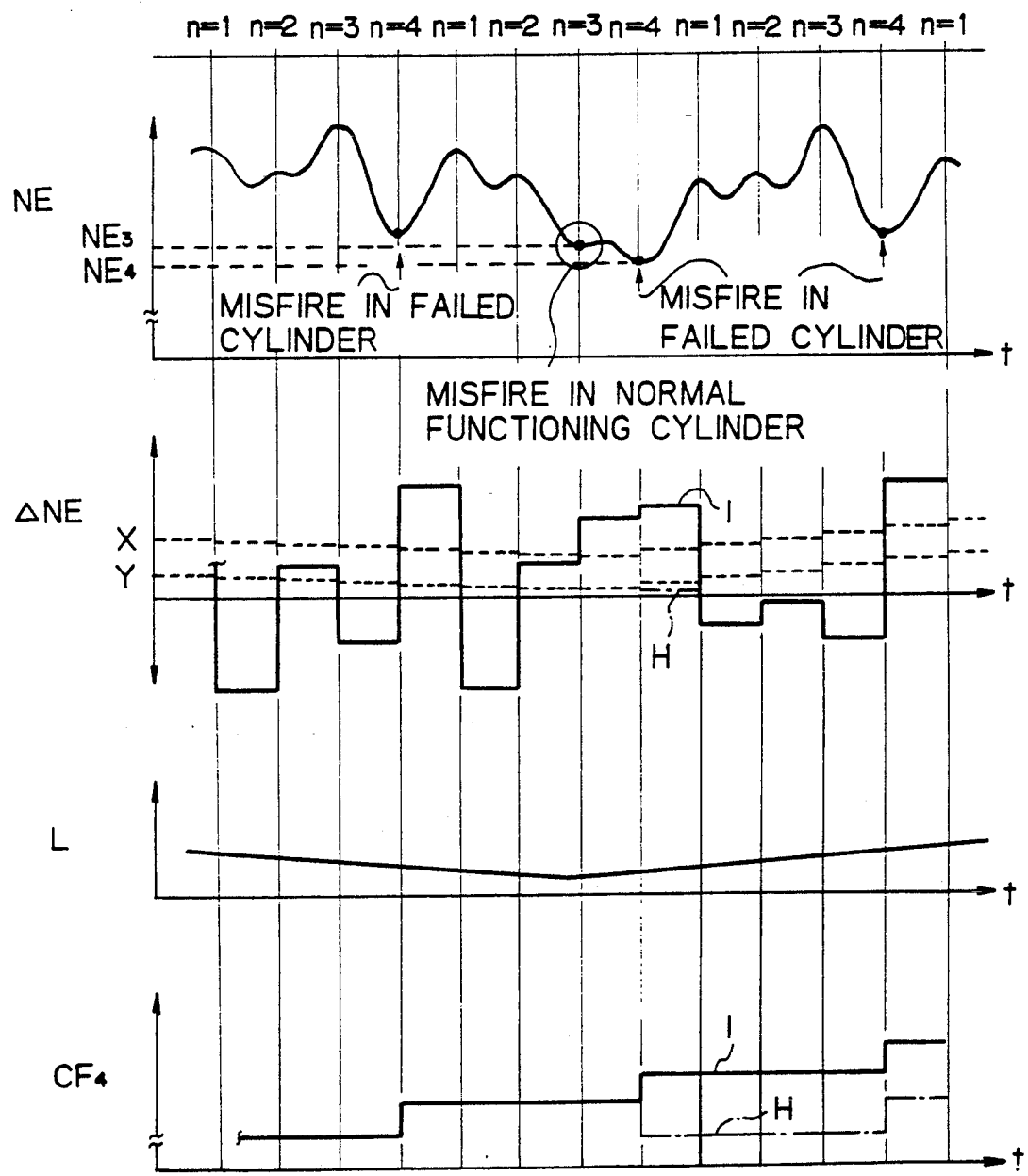
FIG. 5 is a time chart showing changes in the engine speed NE, the variation $\Delta NE$ in engine speed, the reference values X and Y, the engine load L, and the misfire count value $CF_4$.

FIG. 5 shows changes in NE, $\Delta NE$, X, Y, L and $CF_4$. Referring to FIG. 5, the reference values X and Y are increased in accordance with an increase in the engine load L and are decreased in accordance with a decrease of the engine load L, to thereby determine exactly whether or not a misfire has occurred. Accordingly, even if the engine load L is changed, it is determined exactly whether or not a misfire has occurred.

When a misfire has not occurred, the variation $\Delta NE$ in the engine speed is small. If, for example, a failed fuel infector 8 injects a large amount of fuel into the corresponding cylinder (i.e., failed cylinder), an air-fuel mixture fed into the failed cylinder becomes extremely rich, and thus a misfire occurs in the failed cylinder. In this case, the engine speed NE during the combustion process in the failed cylinder is lowered, and accordingly, the variation $\Delta NE$ in the engine speed becomes larger. Therefore, it can be determined that a misfire has occurred when it is determined that the variation $\Delta NE$ in the engine speed is larger than the reference value X. In FIG. 5, the failed fuel injector corresponds to No. 4 cylinder, i.e., No. 4 cylinder is the failed cylinder. In this case, the $O_2$ sensor 14 continues to output a rich signal, and accordingly, when an air-fuel ratio feedback control is executed, an air-fuel mixture fed into the normal-functioning cylinders corresponding to the normal-functioning injectors becomes extremely lean and therefore, a misfire occurs in the normal-functioning cylinders. When a misfire occurs in a normal-functioning cylinder, for example, No. 3 cylinder, the engine speed $NE_3$ during the combustion process in No. 3 cylinder is lowered, and thus a difference between the engine speed $NE_3$ and the engine speed $NE_4$ during the combustion process in the failed cylinder, i.e., the variation $\Delta NE$ ($=NE_3-NE_4$) in the engine speed is smaller than the reference value Y. Therefore, in this case, in a prior art device, the misfire in the failed cylinder cannot be detected and the predetermined value B is subtracted from the misfire count value $CF_4$ as shown by a phantom line H in FIG. 5. In this embodiment of the present invention, when the variation $\Delta NE$ in the engine speed is equal to or larger than the reference value X, and it is determined that a misfire has occurred, the sum of the engine speed NE and the reference value X is memorized as NEB and is used in the next diagnosis process. Accordingly, even if a misfire occurs in a normal-functioning cylinder immediately before the misfire occurs in the failed cylinder, a misfire in the failed cylinder can be easily detected and the predetermined value A added to the misfire count value $CF_4$ of the No. 4 cylinder as shown by a solid line I in FIG. 5.

Returning to FIG. 2, at step 65 it is determined whether or not the time count value CD is equal to or larger than 25.

Figure 6:
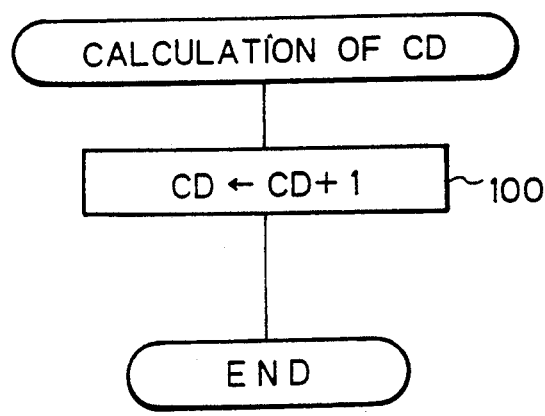
FIG. 6 is a flow chart for executing the calculation of the time count value CD.

FIG. 6 illustrates a routine for the calculation of the time count value CD. This routine is processed by sequential interruptions executed at 1 sec. intervals.

Referring to FIG. 6, at step 100 the time count value CD is incremented by 1. Note, the time count value CD is cleared at step 69 in the routine illustrated in FIG. 2. Note, the time count value CD represents a time elapsed since the diagnosis was started.

Returning to FIG. 2, at step 65, if CD<25, the processing cycle is completed, but if CD≧25, the routine goes to step 66 and it is determined whether or not the misfire count value $CF_n$ is equal to or larger than a predetermined failure determination value, for example, 100·A. If at least one of the misfire count values $CF_1$, $CF_2$, $CF_3$ and $CF_4$ is equal to or larger than 100·A, the routine goes to step 67, it is determined that a failure has occurred in a cylinder, and an indicator lamp is lit. At step 66, if $CF_n<100$·A, step 67 is skipped. Then, at step 68, it is determined whether or not the diagnosis of all of the engine cylinders is completed. If the diagnosis of all of the engine cylinders is not completed, the processing cycle is completed. Conversely, if the diagnosis of all of the engine cylinders is completed, the routine goes to step 69, where $CF_1$, $CF_2$, $CF_3$, $CF_4$, CD, and NEB are cleared, and thus the processing cycle is completed.

As described above, in this embodiment of the present invention, since the reference values X and Y are increased in accordance with an increase in the engine load L, even if the engine load L is changed, it is exactly determined whether or not a misfire has occurred. Accordingly, it can be exactly determined whether or not a failure has occurred in a cylinder.

In this embodiment of the present invention, even if a misfire occurs in a normal-functioning cylinder immediately before a misfire occurs in a failed cylinder, the misfire in the failed cylinder can be easily detected.

In the normal-functioning cylinder in which a misfire has occurred, at the next determination in this normal functioning cylinder that the variation in the engine speed is equal to or smaller than Y, the predetermined value F is subtracted from the misfire count value $CF_n$. Therefore, since the misfire count value $CF_n$ of this normal-functioning cylinder does not become equal to or larger than 100·A, it is not determined that a failure has occurred in this cylinder.

Further, in this embodiment of the present invention, the hardware used for a conventional irregular combustion determining device can be utilized with modification.

A second embodiment of the present invention is now described with reference to FIGS. 7 and 8, and is applied to an engine similar to that illustrated in FIG. 1.

Figure 7A:
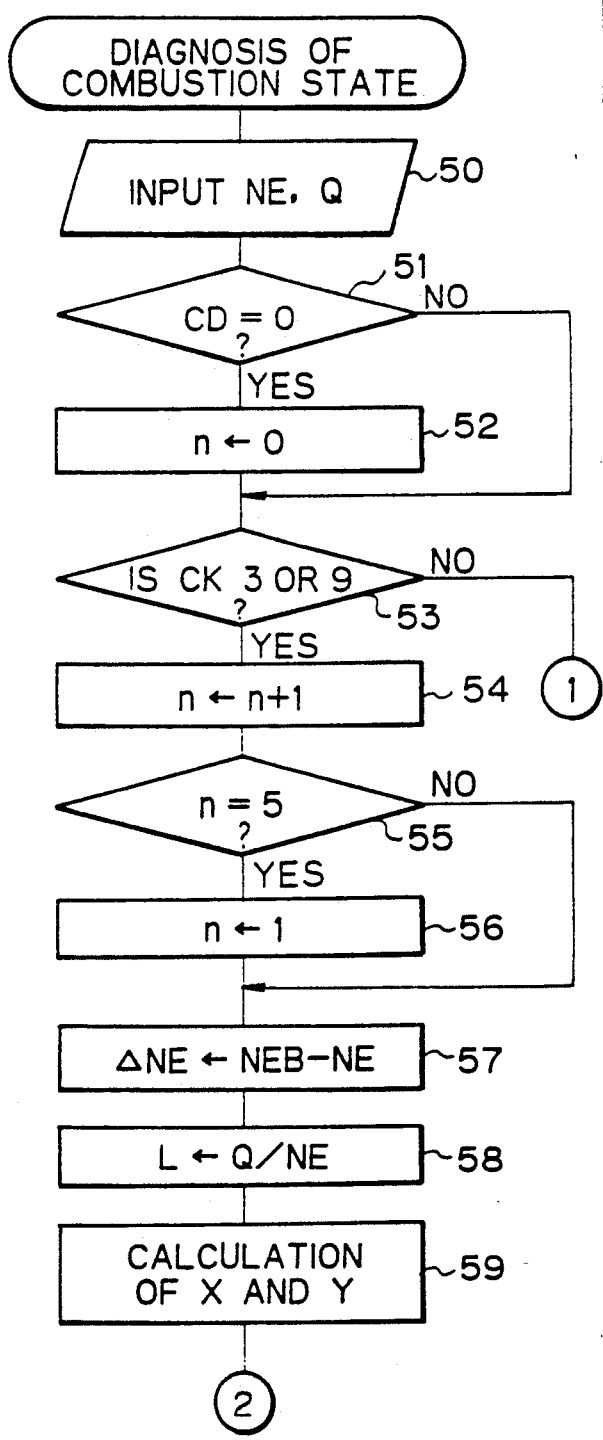
FIG. 7 (including parts A and B) is a flow chart of a second embodiment for executing a diagnosis of a combustion state according to the present invention.
Figure 7B:
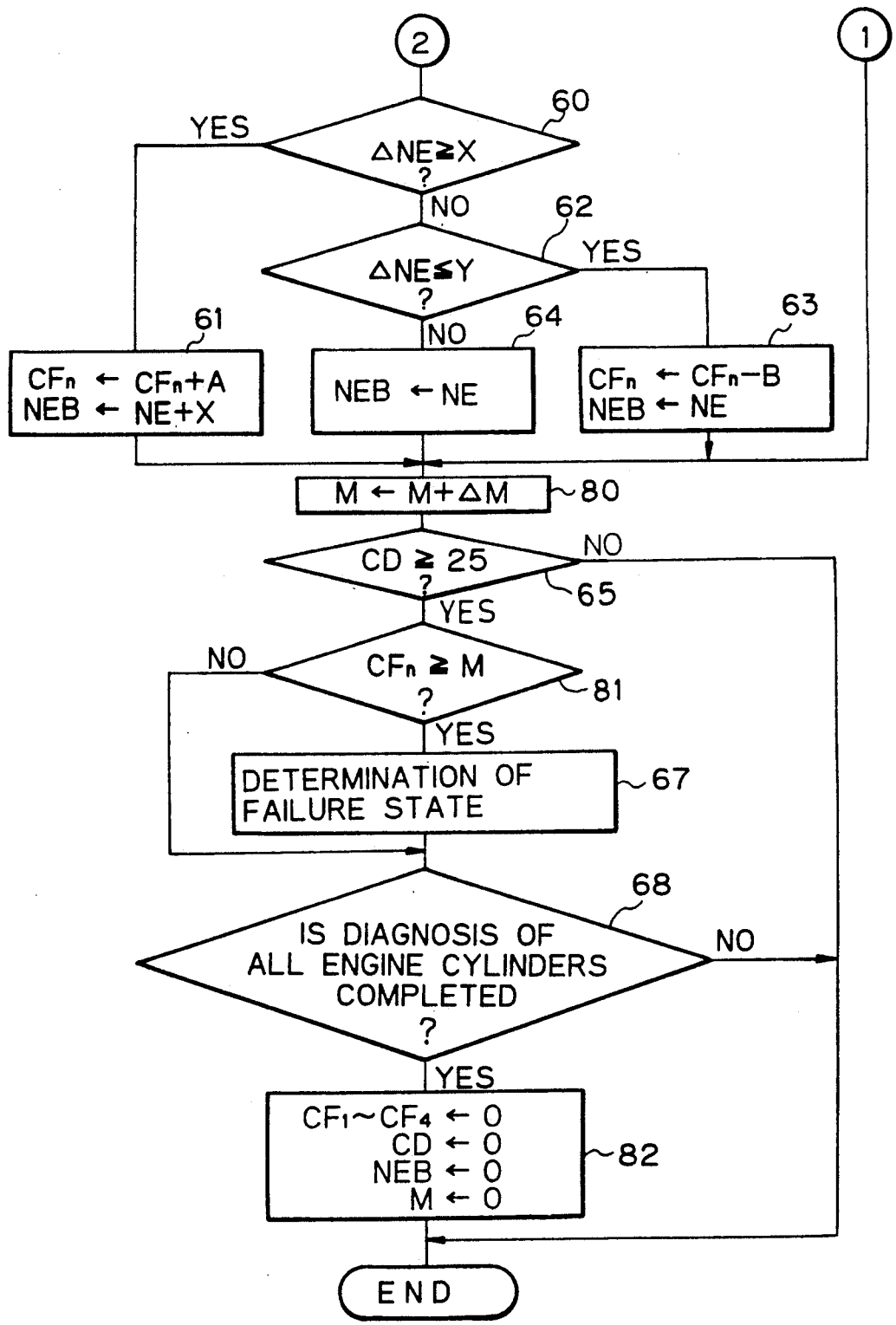

FIG. 7 illustrates a routine for executing a diagnosis of a combustion state in accordance with a second embodiment of the present invention. The routine illustrated in FIG. 7 is processed by sequential interruptions executed at each crank angle of 30°. In FIG. 7, similar steps are indicated by the same step numbers used in FIG. 2, and a description of these similar steps is omitted.

Referring to FIG. 7, at each processing cycle, at step 80, the failure determination value M is increased by an additional value $\Delta M$. The additional value $\Delta M$ is calculated from a map, on the basis of the engine load L.

Figure 8:
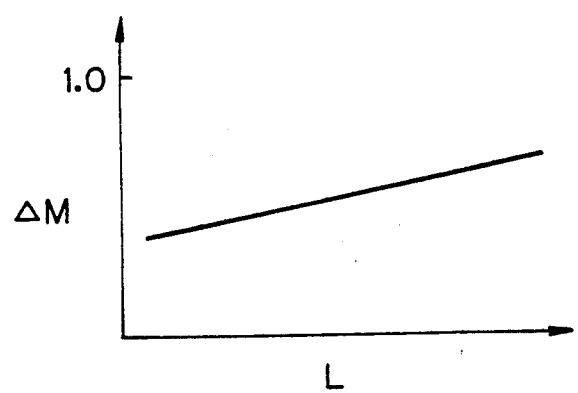
FIG. 8 illustrates the relationship between the additional value $\Delta M$ and the engine load L.

FIG. 8 illustrates the relationship between $\Delta M$ and L. The additional value $\Delta M$ is proportional to the engine load L, and is increased in accordance with an increase in the engine load L. Note, the additional value $\Delta M$ is less than 1.0. Accordingly, the failure determination value M is increased in accordance with an increase in the engine load L during the diagnosis.

Returning to FIG. 7, at step 81 it is determined whether or not the misfire count value $CF_n$ is equal to or larger than the failure determination value M. If at least one of the misfire count values $CF_1$, $CF_2$, $CF_3$ and $CF_4$ is equal to or larger than the failure determination value M, the routine goes to step 67, it is determined that a failure has occurred in a cylinder, and the indicator lamp is lit. At step 81, if $CF_n<M$, step 67 is skipped. Then, at step 68, it is determined whether or not the diagnosis of all of the engine cylinders is completed. If the diagnosis of all of the engine cylinders is not completed, the processing cycle is completed. Conversely, if the diagnosis of all of the engine cylinders is completed, the routine goes to step 82, where $CF_1$, $CF_2$, $CF_3$, $CF_4$, CD, NEB, and M are cleared, and thus the processing cycle is completed.

In this embodiment, since the failure determination value M is also increased in accordance with an increase in the engine load L during the diagnosis, whether or not a failure has occurred in a engine cylinder can be more accurately determined.

Note, in the second embodiment, although the reference values X, Y and the failure determination value M are increased in accordance with an increase in the engine load, the reference values X, Y may be constant and only the failure determination value M increased in accordance with an increase in the engine load.

Furthermore, the engine load L may be calculated on the basis of a pressure in an intake port.

Although the invention has been described with reference to specific embodiments chosen for purposes of illustration, it should be apparent that numerous modifications can be made thereto without departing from the basic concept and scope of the invention.

What is claimed is:

1. A determining device for determining a failure in an engine cylinder of an internal combustion engine, comprising:

an engine load detecting means for detecting an engine load;

an engine speed detecting means for detecting an engine speed at a predetermined crank angle;

a variation detecting means for sequentially detecting a variation in an engine speed between a first engine speed detected by said engine speed detecting means during a combustion process at a first engine cylinder and a second engine speed detected by said engine speed detecting means during a combustion process at a second engine cylinder immediately preceding said first engine cylinder with respect to an ignition sequence of all of the engine cylinders;

a first determining means for determining that a misfire has occurred when the variation in the engine speed detected by said variation detecting means is larger than a predetermined first variation in the engine speed;

a second determining means for determining that a failure has occurred in an engine cylinder when a frequency at which said first determining means determines that a misfire has occurred is larger than a predetermined frequency; and a value control means for increasing at least one of said predetermined first variation in the engine speed and said predetermined frequency in accordance with an increase in said engine load detected by said engine load detecting means.

2. A determining device according to claim 1, wherein said engine load detecting means comprises an air amount sensor for detecting an amount of air fed into the engine cylinder, and calculates said engine load by dividing said amount of air fed into the engine cylinder by said engine speed detected by said engine speed detecting means.

3. A determining device according to claim 1, wherein said engine load detecting means comprises a pressure sensor for detecting a pressure in an intake port and calculates said engine load on the basis of said pressure in the intake port detected by said pressure sensor.

4. A determining device according to claim 1, wherein said variation in the engine speed detected by said variation detecting means is represented by a difference between said first engine speed and said second engine speed.

5. A determining device according to claim 1, wherein said first determining means determines that, when said first determining means has determined that a misfire has occurred, at a next detection of the variation in the engine speed by said variation detecting means, a misfire has occurred when the variation in the engine speed detected by said variation detecting means is larger than a predetermined second variation in the engine speed which is smaller than said predetermined first variation in the engine speed.

6. A determining device according to claim 5, wherein said variation in the engine speed detected by said variation detecting means is represented by a difference between said first engine speed and said second engine speed, and said first determining means determines that, when said first determining means has determined that a misfire has occurred, at a next detection of the variation in the engine speed by said variation detecting means, a misfire has occurred when a difference between said first engine speed and a sum of said second engine speed and a predetermined correction speed becomes larger than said predetermined first variation in the engine speed.

7. A determining device according to claim 6, wherein said predetermined correction speed is equal to said predetermined first variation in the engine speed.

8. A determining device according to claim 1, wherein said first determining means determines that a misfire has not occurred when the variation in the engine speed detected by said variation detecting means is smaller than a predetermined third variation in the engine speed, which is smaller than said predetermined first variation in the engine speed.

9. A determining device according to claim 8, wherein said value control means increases said predetermined first variation in the engine speed and said predetermined third variation in the engine speed in accordance with an increase in said engine load detected by said engine load detecting means.

10. A determining device according to claim 9, wherein said predetermined first and third variations in the engine speed are proportional to said engine load.

11. A determining device according to claim 1, wherein said second determining means comprises a misfire count means having a misfire count value corresponding to each engine cylinder, the misfire count value corresponding to an engine cylinder in which it is determined that a misfire has occurred being increased by a predetermined constant added value each time it is determined by said first determining means that a misfire has occurred in the engine cylinder, and a failure determining means for determining that a failure has occurred in one engine cylinder when said misfire count value corresponding to said one engine cylinder becomes larger than a predetermined failure count value.

12. A determining device according to claim 11, wherein said predetermined failure count value is one hundred times greater than said predetermined constant added value.

13. A determining device according to claim 11, wherein said first determining means determines that a misfire has not occurred when the variation in the engine speed detected by said variation detecting means is smaller than a predetermined third variation in the engine speed, which is smaller than said predetermined first variation in the engine speed, and said misfire count means reduces the misfire count value corresponding to an engine cylinder in which it is determined that a misfire has not occurred by a predetermined constant subtraction value when said first determining means determines that a misfire has not occurred.

14. A determining device according to claim 13, wherein said value control means increases said predetermined first variation in the engine speed and said predetermined third variation in the engine speed in accordance with an increase in said engine load detected by said engine load detecting means.

15. A determining device according to claim 14, wherein said predetermined first and third variations in the engine speed are proportional to said engine load.

16. A determining device according to claim 1, wherein said predetermined first variation in the engine speed is proportional to said engine load.

17. A determining device according to claim 1, wherein said predetermined frequency is proportional to said engine load.

* * * * *